(12) United States Patent
Renan Dos Santos Barreto et al.

(10) Patent No.: US 11,815,215 B2
(45) Date of Patent: Nov. 14, 2023

(54) PIG ROUTING INSERT ADAPTED FOR INSTALLATION IN A STRUCTURE, STRUCTURE AND METHOD

(71) Applicant: FMC TECHNOLOGIES DO BRASIL LTDA, Rio de Janeiro (BR)

(72) Inventors: Rafael Renan Dos Santos Barreto, Rio de Janeiro (BR); Fernando Manuel De Carvalho Ferreira, Rio de Janeiro (BR); Leonardo De Araújo Bernardo, Rio de Janeiro (BR); Jorge Luiz Da Silva Bonfim, Rio de Janeiro (BR); Kleber Stoffel Peres, Rio de Janeiro (BR); Marco Vinicius Soares Da Silva, Rio de Janeiro (BR); Alan Zaragoza Labes, Rio de Janeiro (BR)

(73) Assignee: FMC TECHNOLOGIES DO BRASIL LTDA, Rio de Janeiro (BR)

( * ) Notice: Subject to any disclaimer, the term of this patent is extended or adjusted under 35 U.S.C. 154(b) by 221 days.

(21) Appl. No.: 16/954,137

(22) PCT Filed: Dec. 15, 2017

(86) PCT No.: PCT/BR2017/050382
§ 371 (c)(1),
(2) Date: Jun. 15, 2020

(87) PCT Pub. No.: WO2019/113655
PCT Pub. Date: Jun. 20, 2019

(65) Prior Publication Data
US 2021/0164600 A1    Jun. 3, 2021

(51) Int. Cl.
*F16L 55/128* (2006.01)
*B08B 9/055* (2006.01)
(Continued)

(52) U.S. Cl.
CPC .......... *F16L 55/1283* (2013.01); *B08B 9/043* (2013.01); *F16L 55/00* (2013.01);
(Continued)

(58) Field of Classification Search
CPC . F16L 55/00; F16L 55/24; F16L 55/46; F16L 55/1283; B08B 9/055; Y10T 137/4891
See application file for complete search history.

(56) References Cited

U.S. PATENT DOCUMENTS

| | | | | |
|---|---|---|---|---|
| 1,046,758 A | * | 12/1912 | Fisher | ...... F21L 23/00 |
| | | | | 362/348 |
| 1,300,248 A | * | 4/1919 | Coleman | ...... E03C 1/0465 |
| | | | | 422/276 |

(Continued)

FOREIGN PATENT DOCUMENTS

| | | |
|---|---|---|
| CN | 104532264 A | 4/2015 |
| DE | 19521301 A1 | 12/1996 |

(Continued)

OTHER PUBLICATIONS

International Search report issued in International Application No. PCT/BR2017/050382, dated Oct. 25, 2018 (3 pages).

(Continued)

*Primary Examiner* — Michael R Reid
(74) *Attorney, Agent, or Firm* — Osha Bergman Watanabe & Burton LLP

(57) ABSTRACT

A pig routing insert or drain is used in various subsea systems having a block structure, e.g., block manifolds, with a plurality of perforated fluid passages. The insert generally includes a substantially unrestricted flow opening configured to allow substantially unrestricted fluid flow and passage of a cleaning pig, and a partially restricted opening having at least one pig blocking structure, in which the partially restricted opening is configured to allow substantially unrestricted fluid flow through the partially restricted opening whilst blocking the passage of the cleaning pig through the partially restricted opening. A method for manufacturing and installing the pig routing insert or drain in a machined block manifold includes positioning a manufac- (Continued)

tured pig routing insert at an intersection of first and second perforated fluid flow holes formed in a body of a structure and fastening the manufactured pig routing insert within the intersection in the body.

23 Claims, 17 Drawing Sheets

(51) Int. Cl.
*B08B 9/043* (2006.01)
*F16L 55/38* (2006.01)
*F16L 55/00* (2006.01)
*E21B 41/00* (2006.01)

(52) U.S. Cl.
CPC ............... *F16L 55/38* (2013.01); *B08B 9/055* (2013.01); *E21B 41/0007* (2013.01)

(56) References Cited

U.S. PATENT DOCUMENTS

| | | | | |
|---|---|---|---|---|
| 2,544,190 | A * | 3/1951 | Todd | F01N 3/0226 55/505 |
| 2,977,616 | A * | 4/1961 | Willis | F16L 55/46 15/104.062 |
| 3,100,308 | A * | 8/1963 | De Sena | F16L 55/46 15/104.062 |
| 4,073,303 | A * | 2/1978 | Foley, Jr. | F16L 55/46 15/104.062 |
| 4,174,127 | A | 11/1979 | Carn et al. | |
| 5,027,466 | A * | 7/1991 | Crawford | F16L 55/46 15/104.062 |
| 6,955,266 | B2 * | 10/2005 | Ballet | B01D 35/02 210/433.1 |
| 7,051,760 | B1 * | 5/2006 | Beamer | F16K 11/0873 137/244 |
| 8,800,584 | B2 * | 8/2014 | McNabney | F16L 55/46 15/104.062 |

FOREIGN PATENT DOCUMENTS

GB  2142473 A  1/1985
JP  2005052732 A  3/2005

OTHER PUBLICATIONS

Written Opinion issued in International Application No. PCT/BR2017/050382, dated Oct. 25, 2018 (3 pages).

* cited by examiner

PIG ROUTING INSERT ADAPTED FOR INSTALLATION IN A STRUCTURE, STRUCTURE AND METHOD

FIELD OF THE INVENTION

The object disclosed herein refers to a new design for the manufacture and installation of a pig routing insert at the intersection of at least two holes defined in a body with a block structure. The pig routing insert is used in order that the pig, as used for cleaning and unblocking machined holes or pipes within the structure, may not to be damaged and not enter unwanted pipes or holes.

BACKGROUND OF THE INVENTION

Fluid flow passage and pipe systems, used in several types of equipment employed in oil and gas industries, are frequently blocked by dross and other undesirable substances generally present in fluid extraction, production and transport processes. For example, hydrates, which are one of the biggest enemies of oil exploration, are formed under conditions of low temperature and high pressure, which are customary in the environment of subsea oil transmission lines. Removing hydrates from fluid flow passages and piping systems is just one of several situations in which pipe cleaning and unblocking systems are very important in this sector. A clogged fluid transport line can interrupt the entire production chain, causing major losses for companies in the field and end consumers.

As those skilled in the art know, the current state of the art describes a variety of methods directed to clean and unblock fluid flow passage and pipe systems, such as tools to heat pipe walls, vibrating devices and use of cleaning pigs and, as a last resort, replacing the clogged section of the tube or the flow line.

The use of cleaning pigs is one of the preferred methods in the industry, considering that its use, on many occasions, does not completely interrupt the production, which means reduced loss in the production process. Pigs are devices that are generally made of elastomeric materials with a high strain capacity. It is noted that, less frequently, other materials are used, such as metals, although they are less appropriate. In general, the pig has a cylindrical or spherical shape, or it can also consist of several discs connected by a metal or plastic shaft.

Cleaning and unblocking process is carried out in a simple way. After being inserted into the tube, a certain pressure is imposed on the pig by means of a gas or liquid, pushing it to its route inside the pipes or fluid lines, removing obstructions and cleaning the pipes. An important factor is to offer mechanisms to make the pig pass through the pipes to be cleaned in a desired route. For equipment, for example, as a manifold composed of welded and angled pipes, it is important that the project includes maintenance by using pigs, which must not deviate from the desired cleaning route to be carried out. For this purpose, pig blocking structures are installed in such welded pipes to ensure that the pig does not enter into unwanted pipes or is lost. In welded pipes, the installation of pig blocking structures is simple, since the pig blocking structure or the pig routing insert or drain can be easily welded at the end of a line.

In a machined block manifold, said pig blocking structures cannot be installed, since a block manifold structure is generally manufactured by a single process in which fluid flow passages or perforations or fluid flow holes are perforated (i.e. machined) into the solid body of the machined block manifold. Specifically, in such manifolds in machined blocks, there are no individual exposed pipes or tubes that allow the installation of pig blocking structures at the end of the pipes or tubes, as in conventional ones, which are composed of such welded pipes or tubes.

Therefore, the present patent application is addressed to a pig routing insert that is adapted to be positioned at the intersection of at least two holes defined in a body of a structure, such as a machined block manifold.

SUMMARY OF THE INVENTION

The following is a simplified summary of the object disclosed herein in order to provide a basic understanding of some aspects of the information disclosed herein. This summary is not an exhaustive overview of the revealed object. It is not intended to identify key or critical elements of the described object or to outline the scope of various embodiments disclosed herein. Its only purpose is to provide some concepts in a simplified manner, as a prelude to the more detailed description, which will be discussed further ahead.

An illustrative pig routing insert disclosed herein comprises an insert body which is adapted to be positioned at an intersection of at least two fluid flow perforated holes defined in a body of a structure, a substantially unrestricted flow opening defined in the insert body which is adapted to allow a substantially unrestricted fluid flow through the substantially unrestricted flow opening and a partially restricted opening defined in the insert body comprising at least one pig blocking structure positioned within the partially restricted opening, wherein the partially restricted opening is adapted to allow substantially unrestricted fluid flow through the partially restricted opening whilst blocking the passage of a cleaning pig through the partially restricted opening.

An illustrative structure disclosed herein comprises a body including at least first and second perforated fluid flow holes or passages that meet at an intersection within the body and a pig routing insert positioned at the intersection in the body. In this example, the pig routing insert comprises an insert body, a substantially unrestricted flow opening extending through the insert body, the substantially unrestricted flow opening being in uninterrupted communication with the first perforated fluid flow hole or passage so as to allow substantially unrestricted fluid flow from the first perforated fluid flow hole through the substantially unrestricted flow opening and a partially restricted opening defined in the insert body comprising at least one pig blocking structure positioned within the partially restricted opening, wherein the partially restricted opening is in uninterrupted communication with the second perforated fluid flow hole so as to allow the substantially unrestricted fluid flow from the second perforated fluid flow hole or passage through the partially restricted opening whilst blocking the passage of a cleaning pig through the partially restricted opening. In this specific example, the structure also comprises a first lining that is formed on an inner surface of the first perforated fluid flow hole or passage and a second lining that is formed on an inner surface of the second perforated fluid flow hole or passage.

Also disclosed herein is a new method comprising manufacturing a pig routing insert comprising a substantially unrestricted flow opening defined in the insert body, wherein the substantially unrestricted flow opening is adapted to allow a substantially unrestricted fluid flow through the substantially unrestricted flow opening and a partially restricted opening defined in the insert body comprising at least one pig blocking structure positioned within the partially restricted opening, wherein the partially restricted opening is adapted to allow substantially unrestricted fluid flow through the partially restricted opening whilst blocking the passage of a cleaning pig through the partially restricted opening. In this example, the method also comprises positioning the manufactured pig routing insert at an intersection of the first and second perforated fluid flow holes or passages previously formed in a body of a structure and, subsequently, fastening the manufactured pig routing insert within the intersection in the body.

BRIEF DESCRIPTION OF THE DRAWINGS

Certain aspects of the object disclosed herein will be described in reference to the attached drawings, which are representative and schematic and are not intended to be limitative, in any respect, to the scope of the object disclosed herein.

Figure 1:
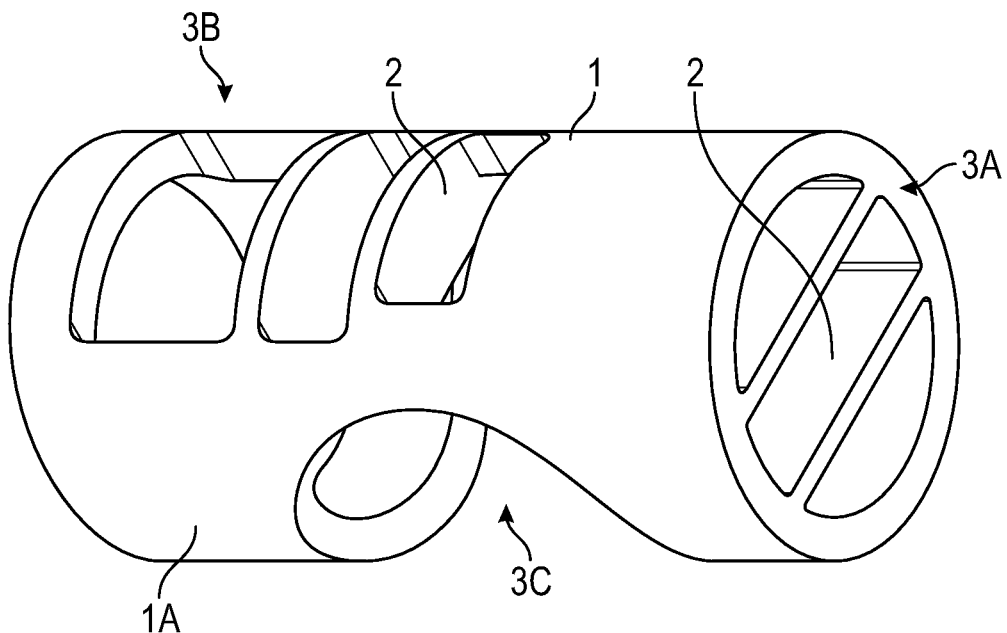
FIG. 1 is a detailed view of an illustrative embodiment of a pig routing insert showing illustrative examples of pig blocking bars according to several aspects disclosed herein.

Although the object revealed herein is liable to several amendments and alternative forms, its specific embodiments were shown by way of example in the drawings and are described in detail herein. It should be understood, however, that the description provided herein of the specific embodiments is not intended to limit the revealed object to the specific forms revealed, but the intention is rather to encompass all amendments, equivalents and alternatives that fall within the spirit and scope of the described object as defined by the attached claims.

DETAILED DESCRIPTION OF THE EMBODIMENTS

Several illustrative embodiments of the revealed object are described below. For the sake of clarity, not all features of an actual embodiment are described in this specification. Naturally, it will be appreciated that, in the development of any actual embodiment, several specific embodiment decisions must be made to achieve the specific objectives of the inventors, such as observing system-related and business-related restrictions, which vary from one embodiment to another. In addition, it will be appreciated that such a development effort can be complex and time consuming, but it would nevertheless be a routine task for those skilled in the art with the advantage of this disclosure.

The present object will now be described in reference to the attached figures. Various structures, systems and devices are represented schematically in the drawings for the purpose of explanation and not to obscure the present disclosure with details that are well known to those skilled in the art. However, the accompanying drawings are included to describe and explain illustrative examples of the present disclosure. The words and expressions used herein must be understood and interpreted as having a meaning consistent with the understanding of those words and expressions by those skilled in the relevant art. No special definition of a term or expression, that is, a definition that is different from the common and customary meaning as understood by those skilled in the art, is intended to be implied by the consistent use of the term or expression contained herein. Insofar as a term or expression is intended to have a special meaning, that is, a meaning different from that understood by those skilled in the art, such special definition will be specifically established in the specification in an explanatory manner that directly and unequivocally provides a special definition for the term or expression.

Figure 2A:
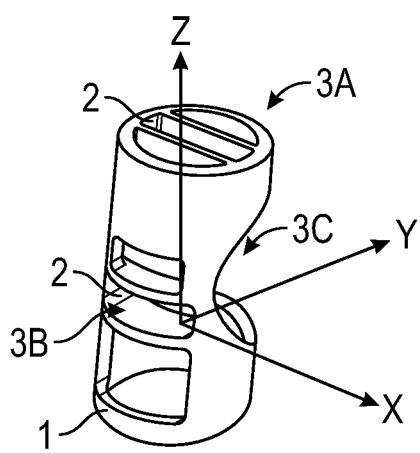
FIGS. 2A and 2B show two illustrative examples of pig routing inserts disclosed herein and their respective illustrative pig blocking bars.
Figure 2B:
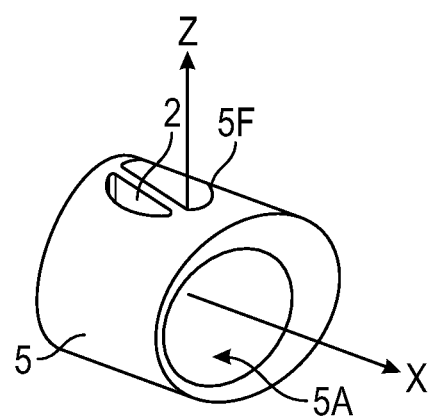

The present patent application reveals a new concept used for several illustrative embodiments of a pig routing insert or drain disclosed herein, which are adapted for use in block structures for subsea devices, such as, for example, a machined block manifold 8 comprising a machined block body 7. Referring to FIGS. 1, 2A and 2B, in an illustrative embodiment, an illustrative embodiment of a pig routing insert or drain 1 disclosed herein comprises a generally cylindrical body 1A composed of a plurality of illustrative pig blocking structures or bars 2 positioned in certain openings in the pig routing insert 1 that can be designed to be adapted to various types of designs, to become compatible with the shape of the fluid flow holes or passages defined in the block structure 7 of manifold 8 and its angles. The pig blocking structures or bars 2, as included in the pig routing insert or drains disclosed herein, prevent the passage of the cleaning pigs to undesirable fluid flow holes machined in block 7 of manifold 8, which would cause major inconveniences and perhaps the interruption of operations, while still allowing a substantially unrestricted working fluid flow through the openings that make up the pig blocking structures or bars 2. As will be appreciated by those skilled in the art after a thorough reading of the present patent application, the pig routing insert or drains disclosed herein allow the substantially unrestricted working fluid flow from the fluid flow holes through the pig routing insert or drains, without significant adverse consequences for the system operation as a whole. FIGS. 2A and 2B show the coordinate references x, y and z to embody the pig routing insert or drain 1 shown in FIG. 1.

FIGS. 2A and 2B show the illustrative pig routing insert or drain shown in FIG. 1, as well as an alternative pig routing insert or drain 5. The pig routing insert or drain 1 comprises a plurality of partially restricted openings 3A, 3B and a substantially unrestricted flow opening 3C. Each of the partially restricted openings 3A, 3B comprises a plurality of pig blocking structures or bars 2 that allow the working fluid to pass substantially unrestricted in the x, y and z directions, ensuring that the pig can only move in the x direction. The substantially unrestricted flow opening 3C contains no pig blocking structures or bars 2. The substantially unrestricted flow opening 3C is adapted to allow the substantially unrestricted fluid flow through the substantially unrestricted flow opening 3C whilst allowing a cleaning pig to pass through the substantially unrestricted flow opening 3C. The partially restricted openings 3A, 3B are adapted to allow substantially unrestricted fluid flow through the partially restricted openings 3A, 3B whilst blocking the passage of a cleaning pig through the partially restricted openings 3A, 3B. The alternative pig routing insert or drain 5 shown in FIGS. 2A and 2B comprises a substantially unrestricted flow opening 5A and a partially restricted opening 5F. The partially restricted opening 5F comprises a plurality of pig blocking structures or bars 2. The pig routing insert 5 allows the fluid to pass in the x and z directions, while ensuring that the pig can only move in the x direction. The substantially unrestricted flow opening 5A is adapted to allow the substantially unrestricted fluid flow through the substantially unrestricted flow opening 5A whilst allowing a cleaning pig to pass through the substantially unrestricted flow opening 5A. The partially restricted opening 5F is adapted to allow the substantially unrestricted fluid flow through the partially restricted opening 5F whilst blocking the passage of a cleaning pig through the partially restricted opening 5F.

Figure 3:
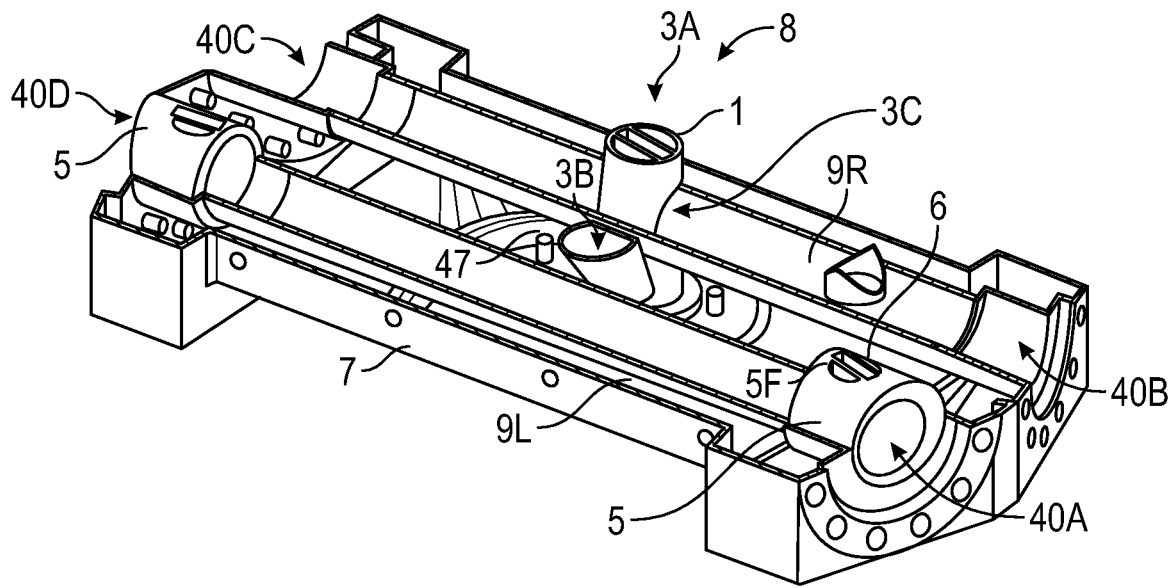
FIG. 3 is a perspective sectional view of an illustrative embodiment of a machined block manifold that shows illustrative examples of the various pig routing inserts installed therein.

As shown in FIG. 3, the illustrative embodiments of the pig routing insert or drains disclosed herein, such as illustrative inserts 1 and 5, can be inserted and installed in a subsea system block 7 of a structure, such as example, a subsea manifold 8. Several methods for inserting the pig routing insert or drains disclosed herein in block 7 of manifold 8 are described in more detail below.

Several methods are disclosed herein for installing the pig routing inserts disclosed herein in a body of a structure. For example, the illustrative embodiments of the pig routing insert or drains disclosed herein (such as the illustrative pig routing insert or drain 1) can be fully machined and fully prefabricated in their final geometry before being installed in the block or the body 7 of manifold 8. On the other hand, some of the illustrative embodiments of the pig routing insert or drains disclosed herein (such as the illustrative embodiment of the pig routing insert or drain 5) can be partially machined to its final configuration before being inserted in the body 7. Subsequently, the partially machined insert was initially inserted and installed in the body of the manifold 8, for example, by welding. More specifically, in one embodiment, the basic structure of the pig routing insert 5 can be machined initially into a structure, for example, a forge which is inserted through a side hole or opening in the manifold 8 and fixed to the block 7 by welding. Subsequently, with the partially machined pig routing insert or drain already fixed to the manifold 8, one or more final machining processes can be performed in the partially perforated pig routing insert or drain 5 to define a final pig routing insert or drain 5 comprising a fluid flow passage of the desired configuration. In one example, the completed or final pig routing insert or drain 5 can be machined so that it has a smoothly curved fluid flow passage in order to avoid abrupt discontinuities that could jeopardize the ready pig passage. An embodiment of a pig routing insert or drain 5 with such a curved flow passage is illustrated in FIG. 3.

Figures 4A, 4B:
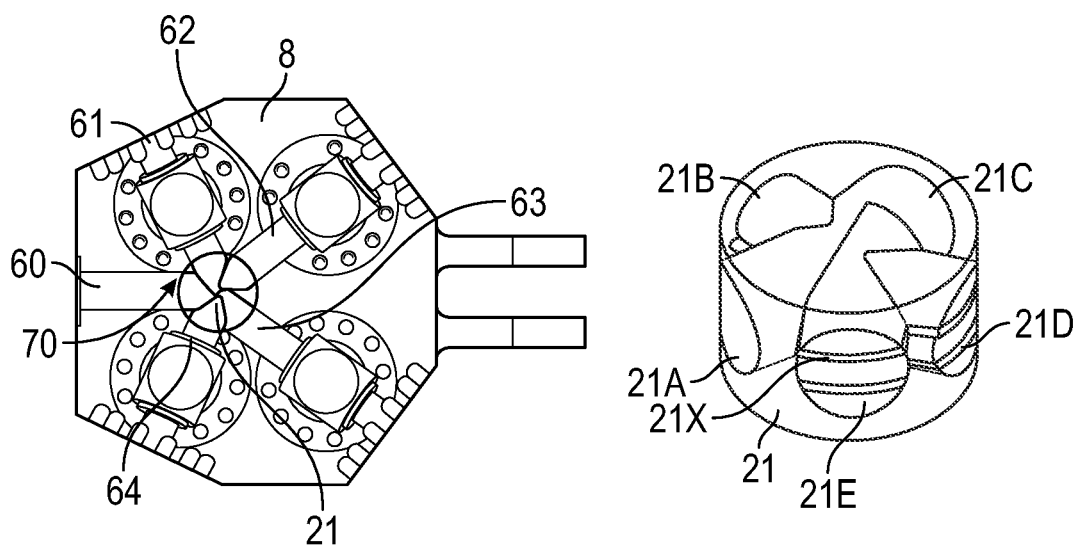
FIGS. 4A and 4B are detailed views of another illustrative embodiment of a pig routing insert disclosed herein, wherein the pig routing insert is positioned at the location where multiple fluid flow holes or passages intersect within the machined block manifold.

FIGS. 4A and 4B illustrate yet another illustrative embodiment of a pig routing insert or drain 21 disclosed herein. The pig routing insert or drain 21 is adapted to be positioned and installed where multiple holes or flow lines defined in the manifold body intersect.

Figure 5:
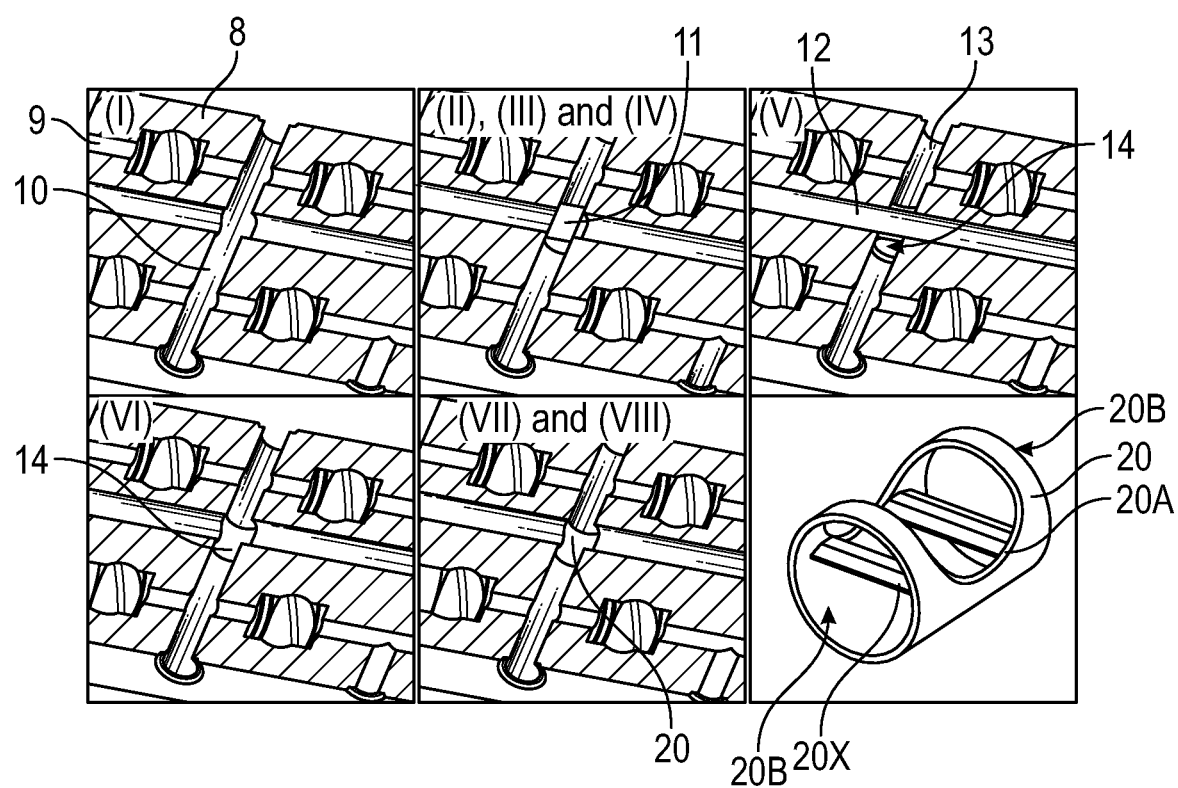
FIG. 5 shows an illustrative embodiment of a method disclosed herein that can be used to install the pig routing insert in a machined block manifold.

FIG. 5 generally describes an illustrative method disclosed herein for manufacturing and installing another alternative embodiment of a pig routing insert or drain 20 in the machined block manifold 8. As will be appreciated by those skilled in the art, after a thorough reading of the present patent application, the method disclosed herein may be used to install any of the various embodiments of the pig routing insert or drains disclosed herein, regardless of the shape or configuration of the pig routing insert or drain as used in the project. In a particularly illustrative example, the method can be carried out in eight basic steps and will be revealed as an illustration. Obviously, this illustrative method does not intend to be limitative to the scope of the inventions disclosed herein.

An illustrative example of a method disclosed herein for manufacturing and installing the illustrative pig routing insert or drain 20 comprises the following basic steps:

a) pre-machining the longitudinal 9 and cross-sectional 10 fluid flow passages or holes in the body or block 7 of the manifold 8;

b) installing a corrosion-resistant material structure 11 (in the form, for example, of a cylindrical block) in the cross-sectional passage 10, in which the corrosion-resistant material structure 11 can be composed of a material that is different from the material of the body 7 of manifold 8, for example, the corrosion-resistant material structure 11 can be composed of a corrosion-resistant material such as, for example, an Inconel-type material;

c) machining a first opening through the corrosion-resistant material structure 11 which is aligned with the initial passage 9 in order to define a partially machined corrosion-resistant material structure 14;

d) making, for example, by welding, a corrosion-resistant material or lining 36 which can be, for example, an Inconel-type material, in the longitudinal passage 9, in order to produce a new lined longitudinal passage 12 covered with the corrosion-resistant material or lining 36 extending through the first opening in the partially machined corrosion-resistant material structure 14;

e) forming, for example, by welding, a corrosion-resistant material or lining 36A in the cross-sectional passage 10 on opposite sides of the partially machined corrosion-resistant material structure 14, so as to produce a new lined passage 13 covered with a corrosion-resistant material lining 36A which is positioned on opposite sides of the reaches of the partially machined corrosion-resistant material structure 14;

f) thermally treating the structure to relieve the stresses or pressures induced by welding;

g) machining a second opening through the partially machined corrosion-resistant material structure 14 that is aligned with the new initial lined passage 13;

h) positioning a prefabricated pig routing insert or drain 20 in the manifold 8 through the passage 13 until the moment the prefabricated insert or drain 20 is positioned at the intersection of the passages 12 and 13; and i) blocking the prefabricated pig routing insert or drain 20 in position within the intersection, preferably by welding Inconel with Inconel, without the need to relieve stresses.

The fluids carried by the fluid flow hole or passage system of the manifold have corrosive characteristics, thus suggesting the use of corrosion-resistant materials to protect the equipment. In an illustrative embodiment, the corrosion-resistant material is, preferably, but without limitations, Inconel. The deposition of the corrosion-resistant material can be carried out by means of welding processes widely known to those skilled in the art, such as coating, and are shown by processes III, IV and V of FIG. 5.

The pig routing insert or drain 20, as well as other embodiments of the pig routing insert or drains disclosed herein, can also be manufactured from fluid compatible, corrosion-resistant material, which is different from the material of the body 7 of the manifold 8, such as Inconel 18, but other corrosion-resistant materials can also be used.

FIGS. 6A-6C, 7A-7C, 8A-8C, 9A-9C, 10A-10C, 11A-11C, 12A-12C, 13A-13C, 14A-14C and 15A-15C are several views that show, further in more detail, an illustrative embodiment of a method disclosed herein (see FIG. 5) that can be used to install an illustrative example of a prefabricated pig routing insert 20 in a machined block manifold 8 at an intersection 30 of two illustrative initial flow passages (or holes) 9, 10 defined in the body of the manifold 8. Passage 9 has a center line 9A, and the passage 10 has a center line 10A. In these drawings, drawings "A" are expanded views of portions of the perspective and sectional views shown in FIG. 5; drawings "B" are plan views of passages 9, 10, and the intersection 30; and drawings "C" are sectional views taken through the center line 10A of passage 10 in a plane that is normal to the center line 9A of passage 9.

Figure 6A:
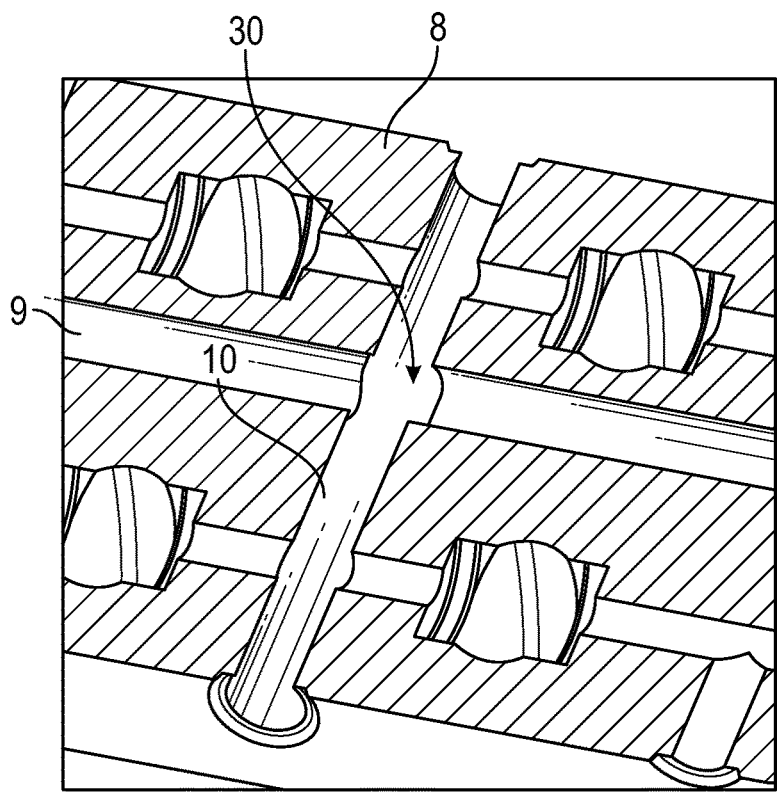
FIGS. 6A-6C, 7A-7C, 8A-8C, 9A-9C, 10A-10C, 11A-11C, 12A-12C, 13A-13C, 14A-14C and 15A-15C are several views that show, further in more detail, an illustrative embodiment of a method disclosed herein that can be used to install a pig routing insert in a machined block manifold.
Figure 6B:
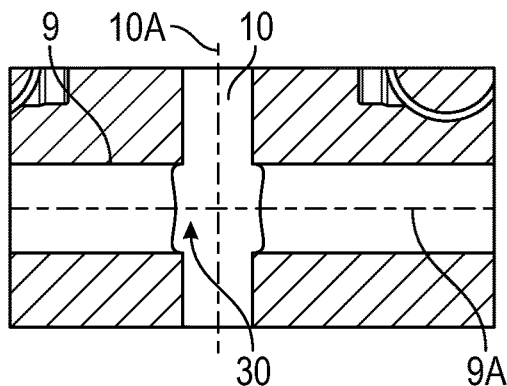
Figure 6C:
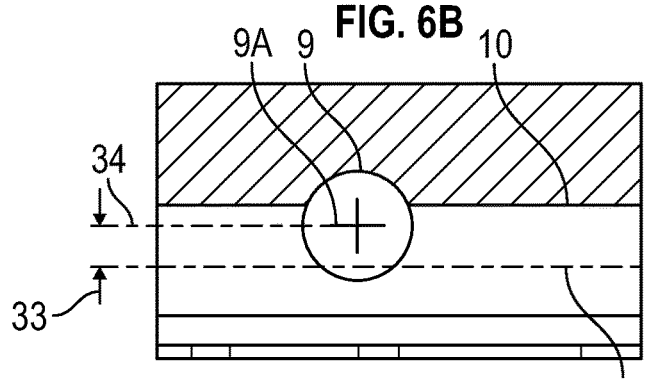

Referring to FIG. 6C, in the illustrative example showed here, the center lines 9A, 10A, of the initial passages 9, 10, are respectively vertically offset from one another by a distance 33. The sectional views in FIG. 5 and drawings "A" are taken on a plane indicated by reference number 34 in FIG. 6C, which includes the center line 9A of the initial passage 9, where the plane 34 is parallel to the center line 10A of the initial passage 10. As shown in FIG. 6C, the initial passages 9 and 10 only partially intersects. That is, the initial passage 10 only intersects or crosses a lower portion of the initial passage 9, that is, a partial or segmented circular configuration when looking at the view shown in drawings "C". On the other hand, the initial passage 9 intersects or crosses an upper portion of the initial passage 10. Obviously, as will be appreciated by those skilled in the art, after a thorough reading of the present patent application, in some embodiments, the center lines 9A, 10A can be positioned on a shared plane. In addition, the size, for example, the diameter, of the passages can be approximately the same (as in the illustrated example, wherein the diameter of the initial passage 9 is approximately the same as the initial diameter of the passage 10), or the diameters of the passages 9, 10 can be different. In addition, in some embodiments, the size of the initial passages 9, 10 and their relative positioning may be such that the passages intersect completely with each other, for example, both initial passages can have the same size, with the center lines of both initial passages located on the same plane. Another example of where the initial passages can completely intersect each other would be the case wherein one of the initial passages can be smaller than the other, so that the longer passage intersects or crosses the entire lesser pass. In a plan view as shown in FIG. 6B and/or in the side view as shown in FIG. 6C, the angle between the center lines of the passages 9, 10 can be substantially normal, so as to result in a substantially normal intersection 30. Alternatively, the center lines of passages 9, 10 may be oriented at non-normal angles to each other, thus resulting in a non-normal intersection 30. Thus, the size, relative positioning and nature and degree of intersection of the flow passages should not be considered as a limitation to the inventions disclosed and claimed herein.

FIGS. 6A-6C illustrate the manifold 8 after the initial passages 9, 10 have been machined in the block manifold 8, thus defining the intersection 30 between the initial passages 9, 10.

Figure 7A:
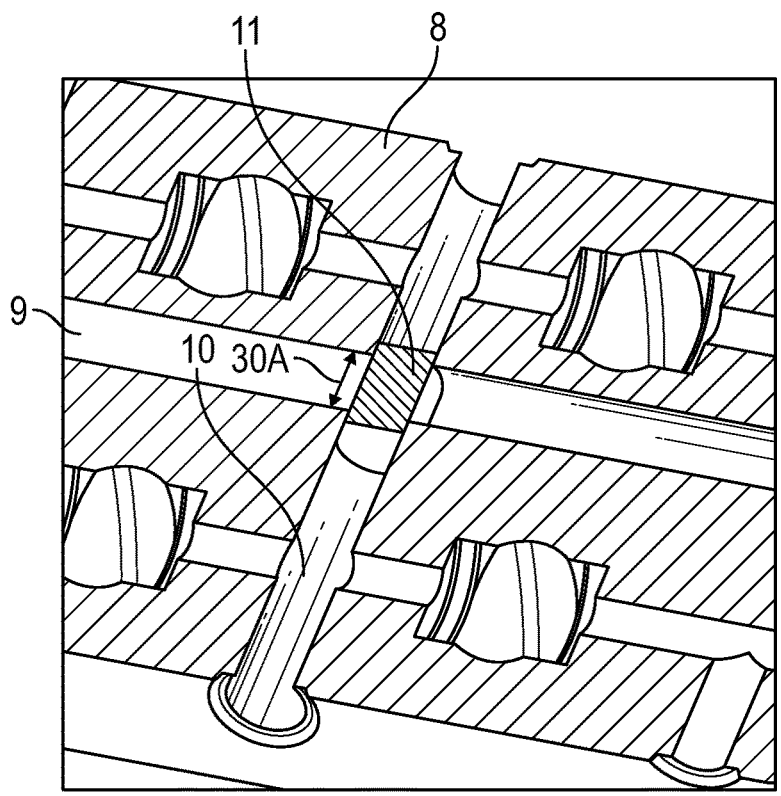
Figure 7B:
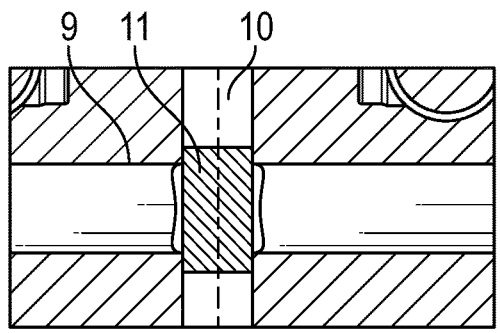
Figure 7C:
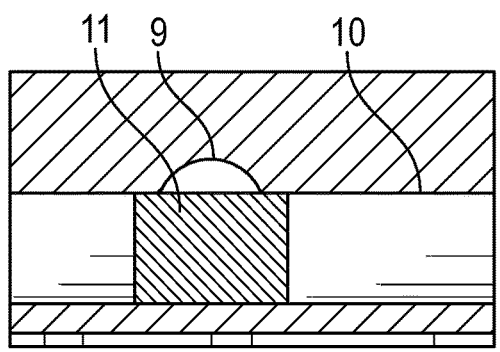

FIGS. 7A-7C illustrate the manifold 8 after a corrosion-resistant material structure 11 has been inserted into the manifold 8 through the initial passage 10 and positioned at the intersection 30. In an illustrative embodiment, the corrosion-resistant material structure 11 may be in the form of a solid circular cylindrical block of corrosion-resistant material. Note that the axial length of the corrosion-resistant material structure 11 is greater than an axial length 30A of the intersection 30 in a direction parallel to the center line 10A of the initial passage 10. As indicated above, in an illustrative embodiment, the corrosion-resistant material structure 11 is a solid material, but this may not occur in all applications. For example, if desired, the corrosion-resistant material structure 11 could have an initial opening or pilot hole (not shown) machined in the body of the corrosion-resistant material structure 11 prior to installation of the corrosion-resistant material structure 11 (the opening of the initial pilot hole being therein) in the body 7. In one embodiment, the pilot hole or opening would be coaxial with the long axis of the corrosion-resistant material 11, and this initial opening would have a diameter smaller than the diameter of the final opening that will be formed in the corrosion-resistant material 11 which is aligned with the passage 10.

Figure 8A:
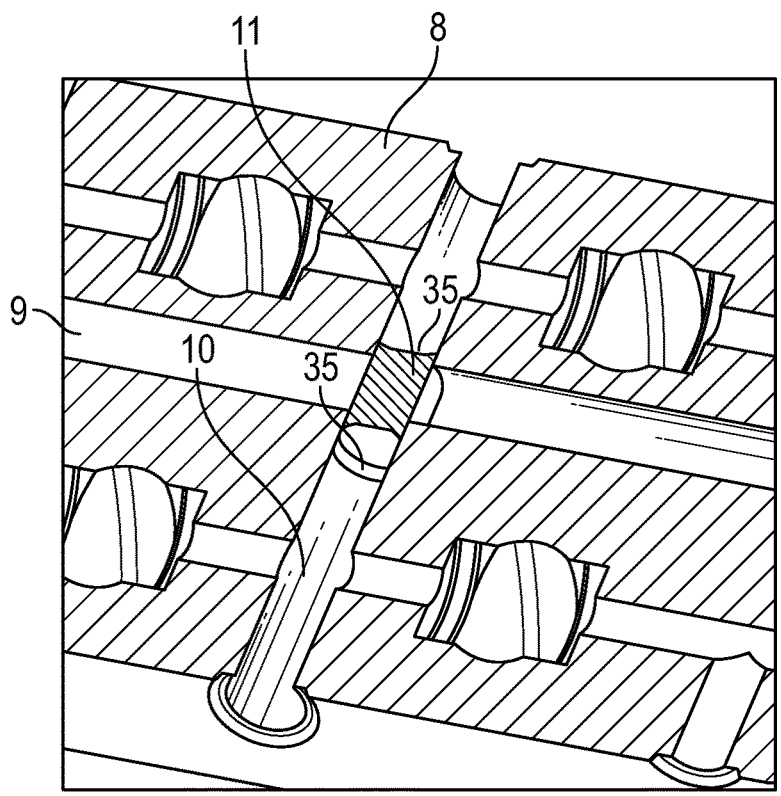
Figure 8B:
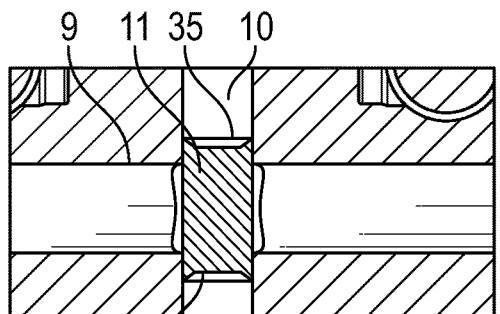
Figure 8C:
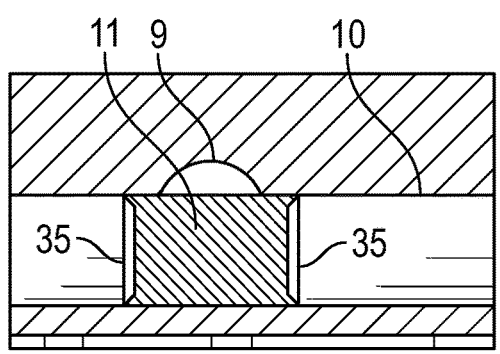

FIGS. 8A-8C illustrate the manifold 8 after the corrosion-resistant material structure 11 had been welded in position within the initial passage 10 at intersection 30, as indicated by the simplistic illustrated weld metal 35 at both ends of the solid block of corrosion-resistant material 11.

Figure 9A:
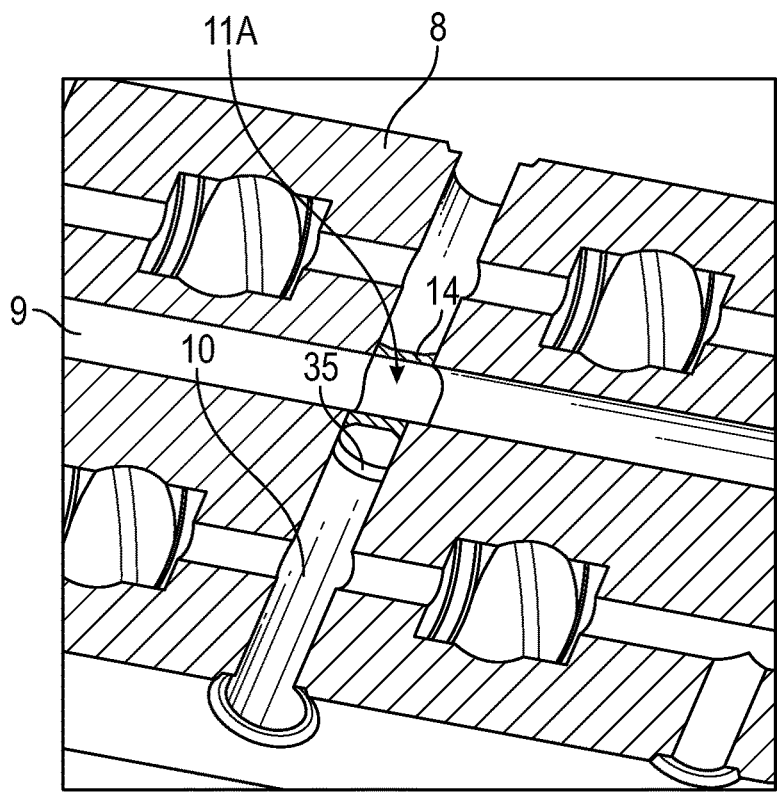
Figure 9B:
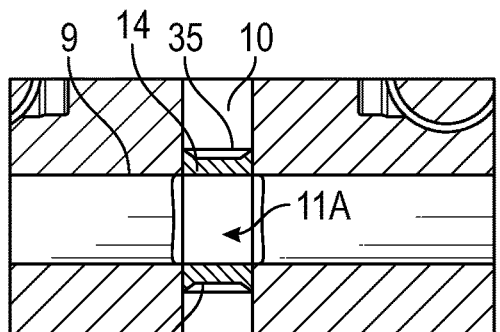
Figure 9C:
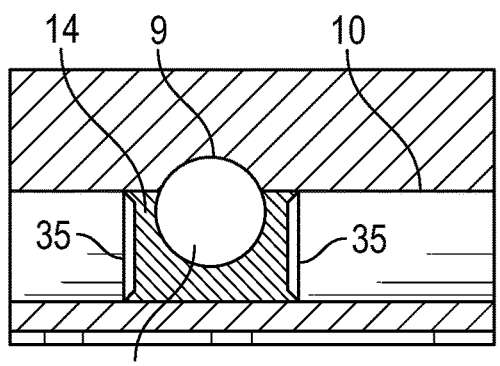

FIGS. 9A-9C represent the manifold 8 after a first perforating process had been carried out through the initial passage 9 in the corrosion-resistant material structure 11 in order to define a first hole 11A extending through the corrosion-resistant material structure 11. As mentioned above, this process defines a partially machined corrosion-resistant material structure 14. In the example shown, and as noted above, the first hole 11A has a partial or segmented circular configuration when viewed in section (see FIG. 9C). The sectional configuration of hole 11A corresponds to the intersection projected from the sectional area of the initial passage 9 with the initial corrosion-resistant material structure 11. Note that the hole 11A has a partial or segmented circular shape due to the vertical shift 33 (see FIG. 6C) between the center lines 9A, 10A of the initial passages 9, 10, respectively. If the center lines 9A, 10A are positioned in the same plane, the hole 11B through the corrosion-resistant material 11 would have a circular configuration with approximately the same inner diameter as that of the initial passage 9.

Figure 10A:
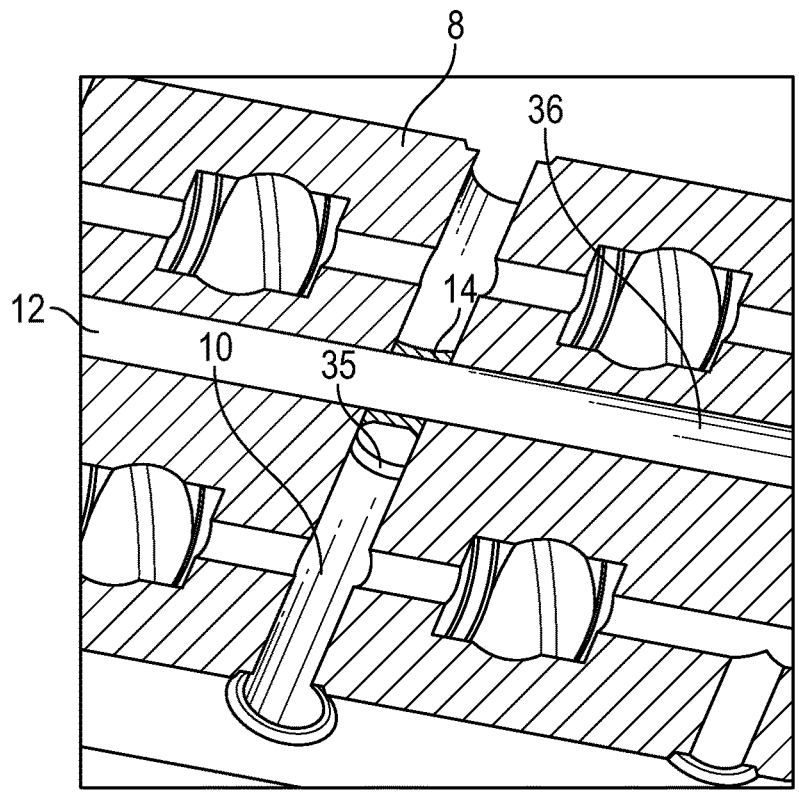
Figure 10B:
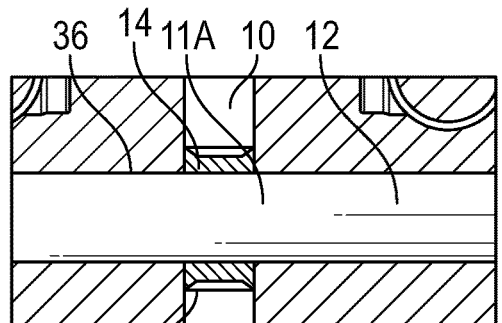
Figure 10C:
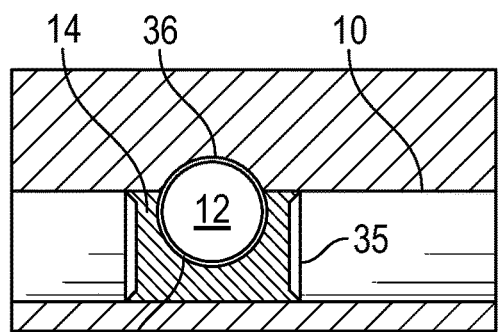

FIGS. 10A-10C illustrate the manifold 8 after a corrosion-resistant coating or lining material 36 had been formed on the inner surface of the initial passage 9 and in hole 11A within the partially machined corrosion-resistant material structure 14. As mentioned above, the process operation defines a new coated or lined longitudinal passage 12 extending through the manifold 8. The corrosion-resistant lining material 36 can be formed by performing a welding process, can be formed to any desired thickness and can include any desired material, for example, an Inconel material, a stainless steel material or any other type of corrosion-resistant material, etc. Note that, in reference to FIGS. 9B-C and FIGS. 10B-C, the corrosion-resistant lining material 36 is formed within the partial circular opening 11A and in the portion of the passage 12 extending above the opening 11A.

Figure 11A:
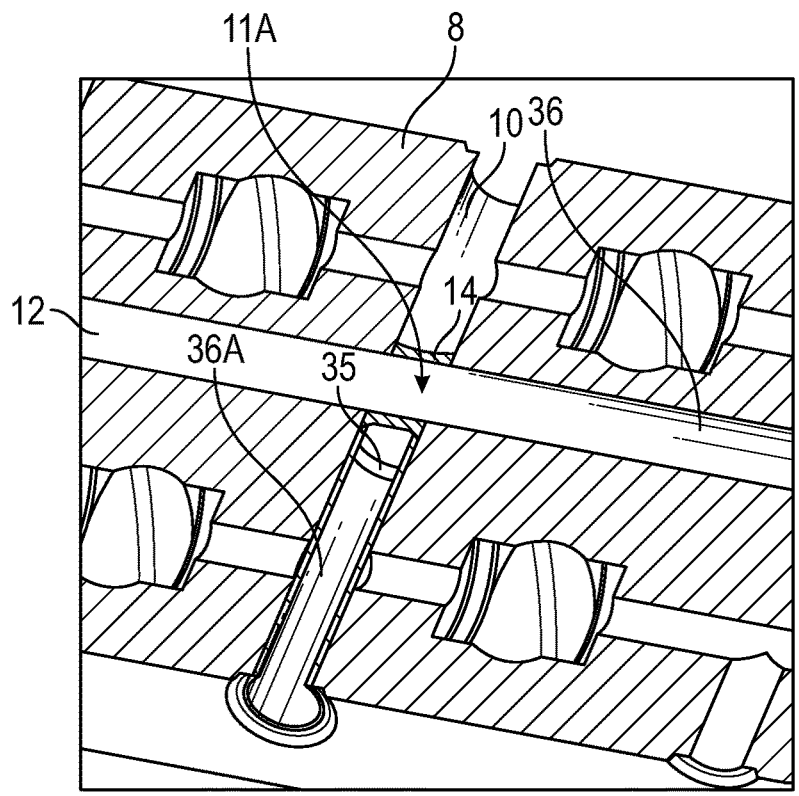
Figure 11B:
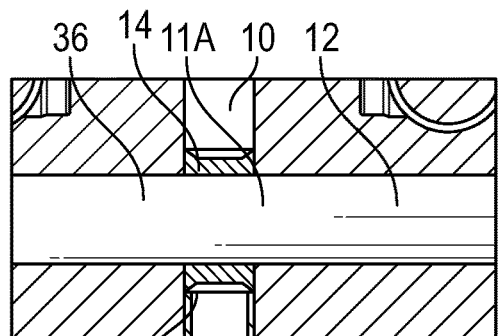
Figure 11C:
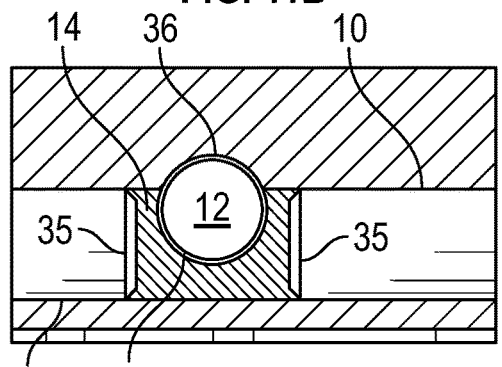

FIGS. 11A-11C illustrate the manifold 8 after the corrosion-resistant coating or lining material 36A had been formed on the inner surface of one side of the initial passage 10 to the point where the corrosion-resistant lining material 36A has reached the partially machined corrosion-resistant material structure 14. The corrosion-resistant coating or lining material 36A may be of the same material as the corrosion-resistant coating or lining material 36. Different reference numbers are used for convenience only.

Figure 12A:
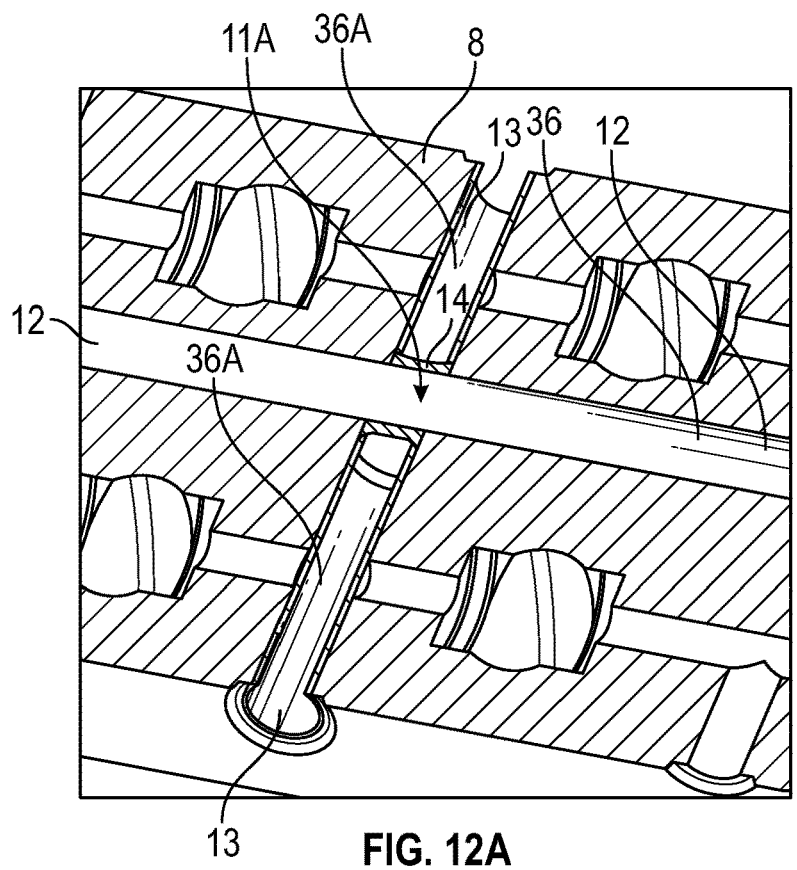
Figure 12B:
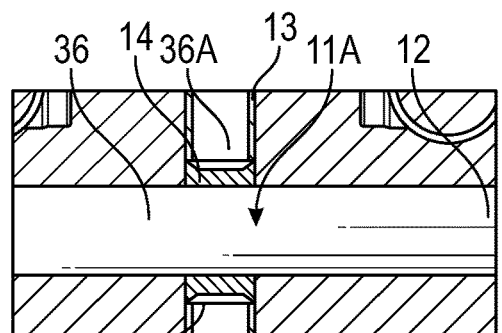
Figure 12C:
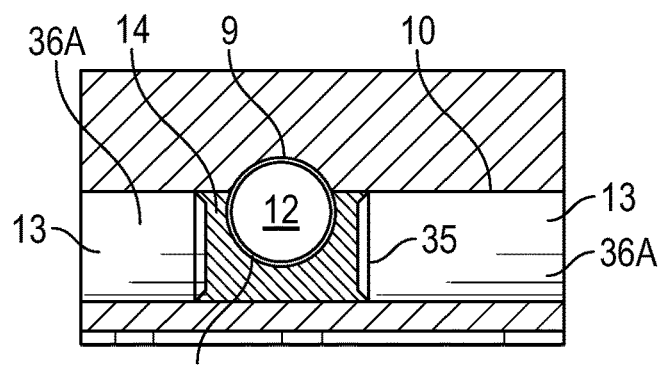

FIGS. 12A-12C illustrate the manifold 8 after the corrosion-resistant coating or lining material 36A had been formed on the inner surface across the initial passage 10 to the point where the corrosion-resistant lining material 36A has reached the partially machined corrosion-resistant material structure 14. As mentioned above, the process operation defines a new coated or lined longitudinal passage 13 in the manifold 8 to the partially machined corrosion-resistant material structure 14.

Figure 13A:
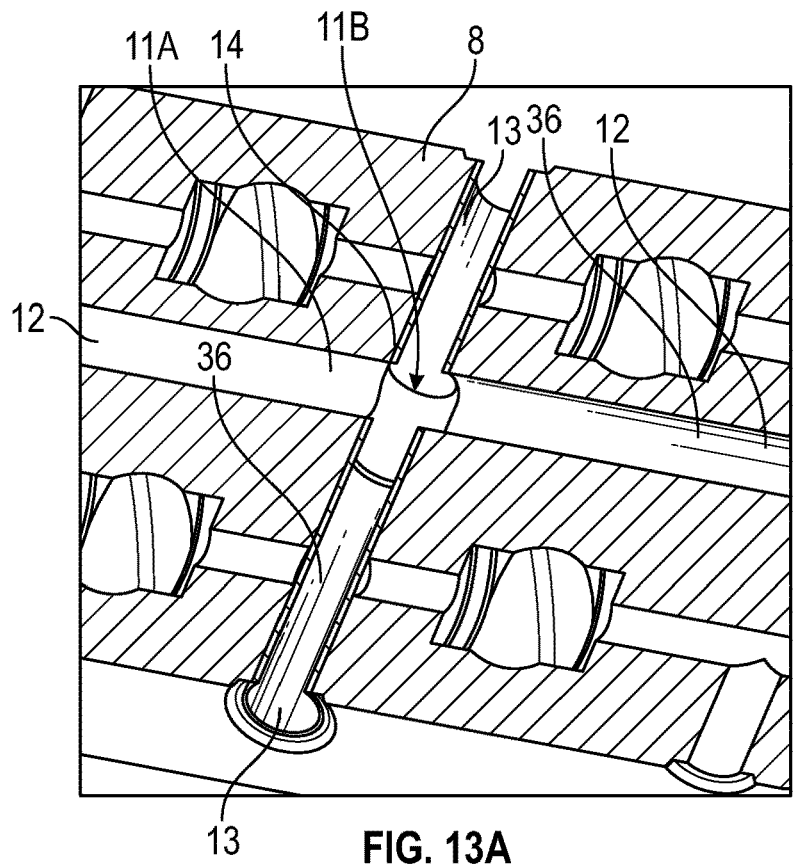
Figure 13B:
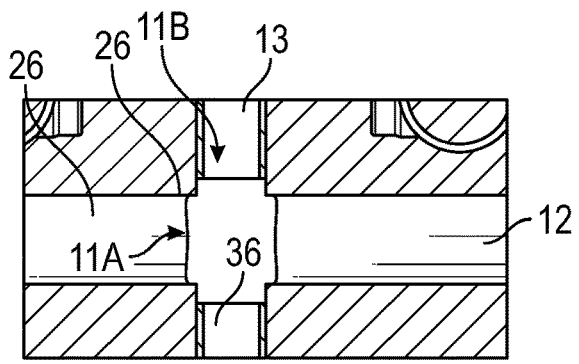
Figure 13C:
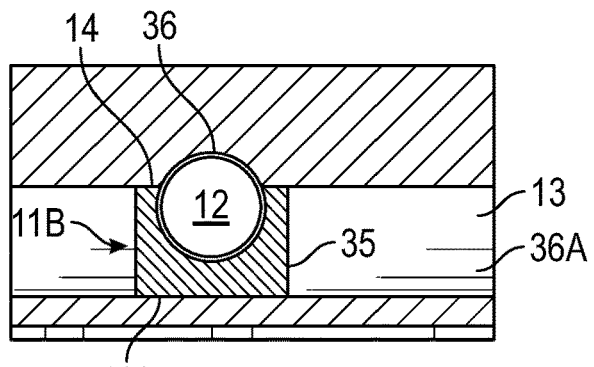

FIGS. 13A-13C represent the manifold 8 after another perforating process had been carried out through the lined passage 13 (and passage 10) in the partially machined corrosion-resistant material structure 14 in order to define a second hole 11B extending through the fully machined corrosion-resistant material structure 14A. In effect, the fully machined corrosion-resistant material structure 14A now constitutes a corrosion-resistant material sleeve that is positioned within the passage 13 and covers the entire intersection 30. At this point, the corrosion-resistant material or sleeve 14A has a machined inner surface. The final thickness of the fully machined corrosion-resistant material structure or sleeve 14A may vary according to the specific application, for example, 3 to 6 mm. In the illustrated example, the second hole 11B has a circular configuration when viewed in section. The sectional configuration of the second hole 11B corresponds to the intersection projected from the sectional area of the coated or lined passage 13 with the partially machined corrosion-resistant material structure 14. As illustrated, the second hole 11B intersects with the first hole 11A.

Figure 14A:
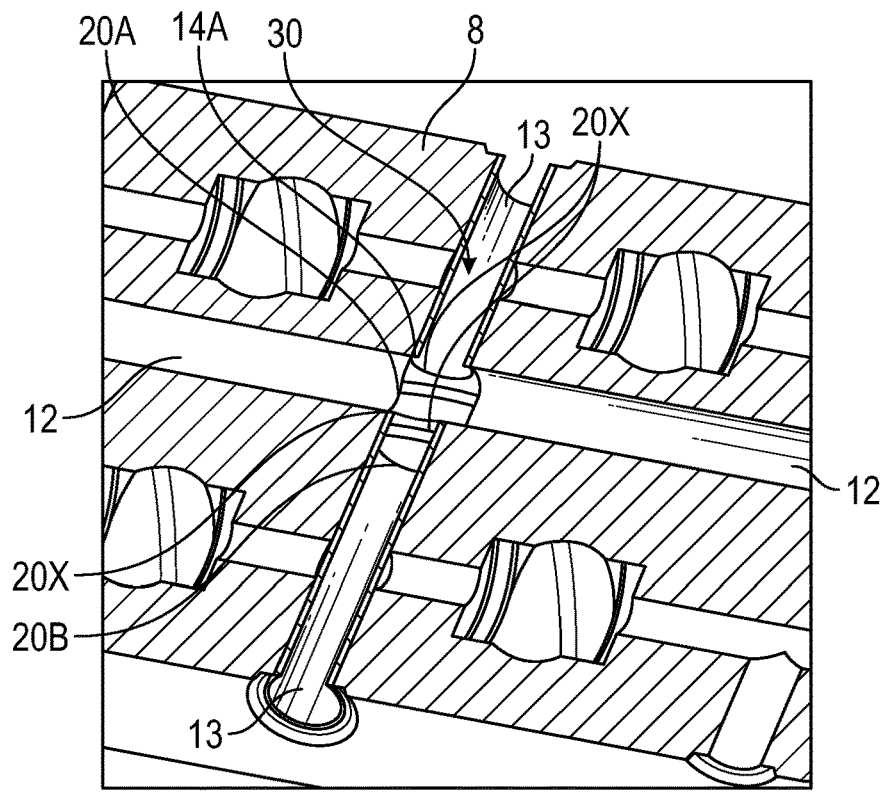
Figure 14B:
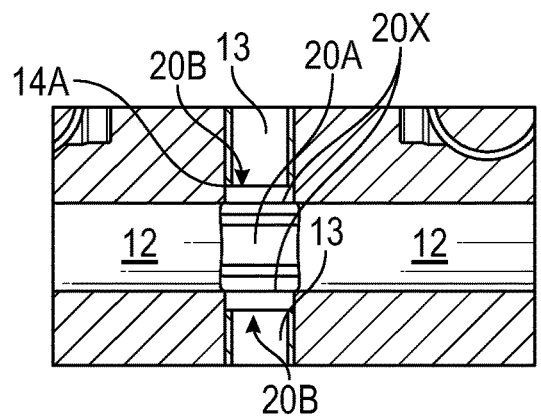
Figure 14C:
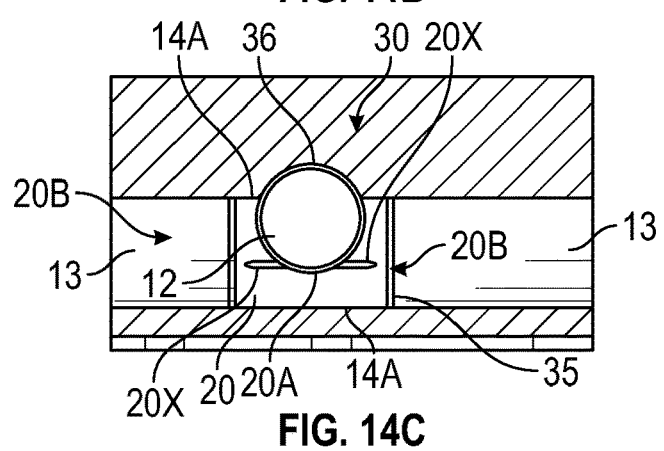

FIGS. 14A-14C illustrate the manifold 8 after the prefabricated pig routing insert or drain described above with pig blocking structures or bars 20X had been inserted into the manifold 8 through the lined passage 13 and positioned through the intersection 30 between the lined passages 12, 13. More specifically, in an illustrative embodiment, the prefabricated pig routing insert or drain was positioned entirely within the second unlined hole 11B (see FIG. 13C) defined in the fully machined corrosion-resistant material structure or sleeve 14A. It is clear that, if desired, in some applications, the prefabricated pig routing insert or drain 20 may extend beyond the unlined hole 11B in the sleeve 14A, i.e. parts of the prefabricated pig routing insert or drain 20 can be positioned in the passage 13 on opposite sides of the sleeve 14A. However, in both situations, for at least a portion of an axial length of the prefabricated pig routing insert or drain 20 (and, in some cases, the entire axial length of the prefabricated pig routing insert or drain 20), an outer surface of the pig routing insert or drain 20 is positioned on and in contact with the inner machined surface of the corrosion-resistant material or sleeve 14A. Referring to FIG. 5 and FIGS. 14A-14C, note that the opening 20A in the prefabricated pig routing insert or drain 20 is sized and positioned to align or combine with the segmented or partial circular opening corresponding to the first hole 11A defined in the corrosion-resistant material or sleeve 14A. Also note that opening 20A in the prefabricated pig routing insert or drain 20 constitutes a substantially unrestricted flow opening defined in the prefabricated pig routing insert or drain 20 which is adapted to allow substantially unrestricted fluid flow, for example, from passage 12. The substantially unrestricted flow opening 20A is also adapted to allow a cleaning pig (not shown) to pass through opening 20A. Also note that the prefabricated pig routing insert or drain 20 comprises two partially restricted illustrative openings 20B, each having at least one pig blocking structure 20X positioned within the partially restricted opening, wherein each of the partially restricted openings 20B is adapted to allow substantially unrestricted fluid flow whilst blocking the passage of a cleaning pig through the partially restricted openings 20B.

Figure 15A:
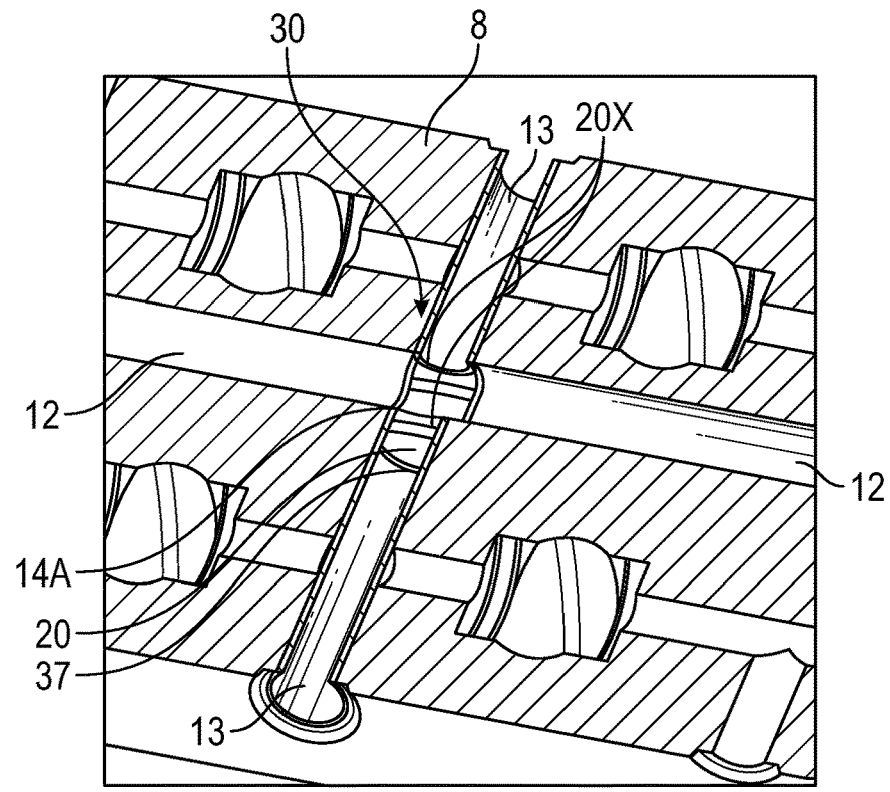
Figure 15B:
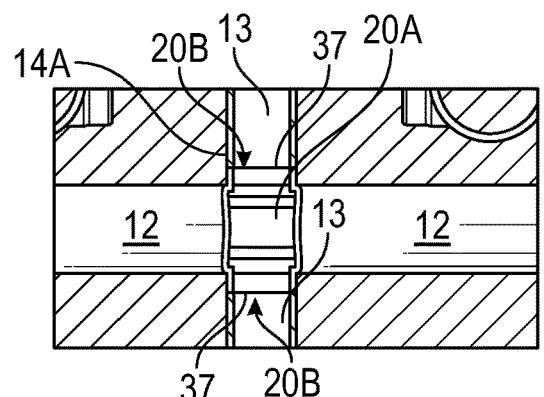
Figure 15C:
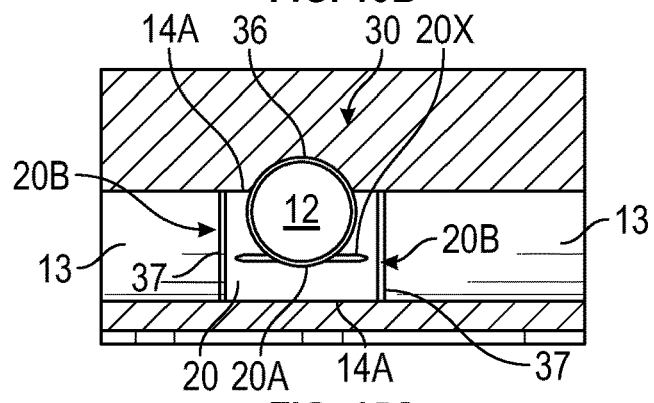

FIGS. 15A-15C illustrate the manifold 8 after the prefabricated pig routing insert or drain described above 20 had been welded in its final installed position within the corrosion-resistant material or sleeve 14A at intersection 30, as indicated by the weld metal 37 simplistically illustrated at both ends of the prefabricated routing insert or drain 20. Obviously, as noted above, in some embodiments, the axial length of the prefabricated pig routing insert or drain 20 may be greater than the axial length of the sleeve 14A, such that at least a portion of the prefabricated pig routing insert or drain 20 extends beyond the ends of the sleeve 14A.

Figure 16A:
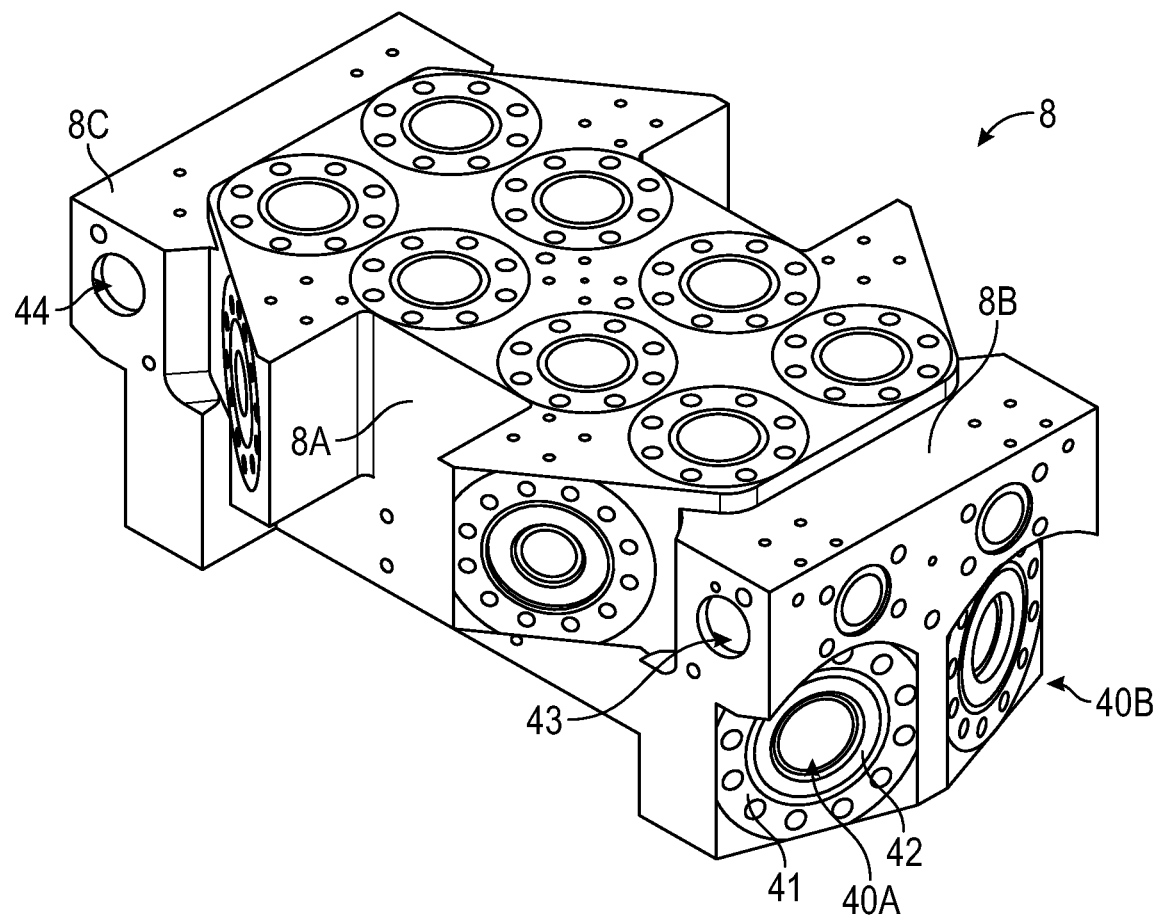
FIG. 16A-16E are several views of an illustrative embodiment of a pig routing insert disclosed herein comprising a curved flow path that extends at least partially through the pig routing insert.
Figure 16B:
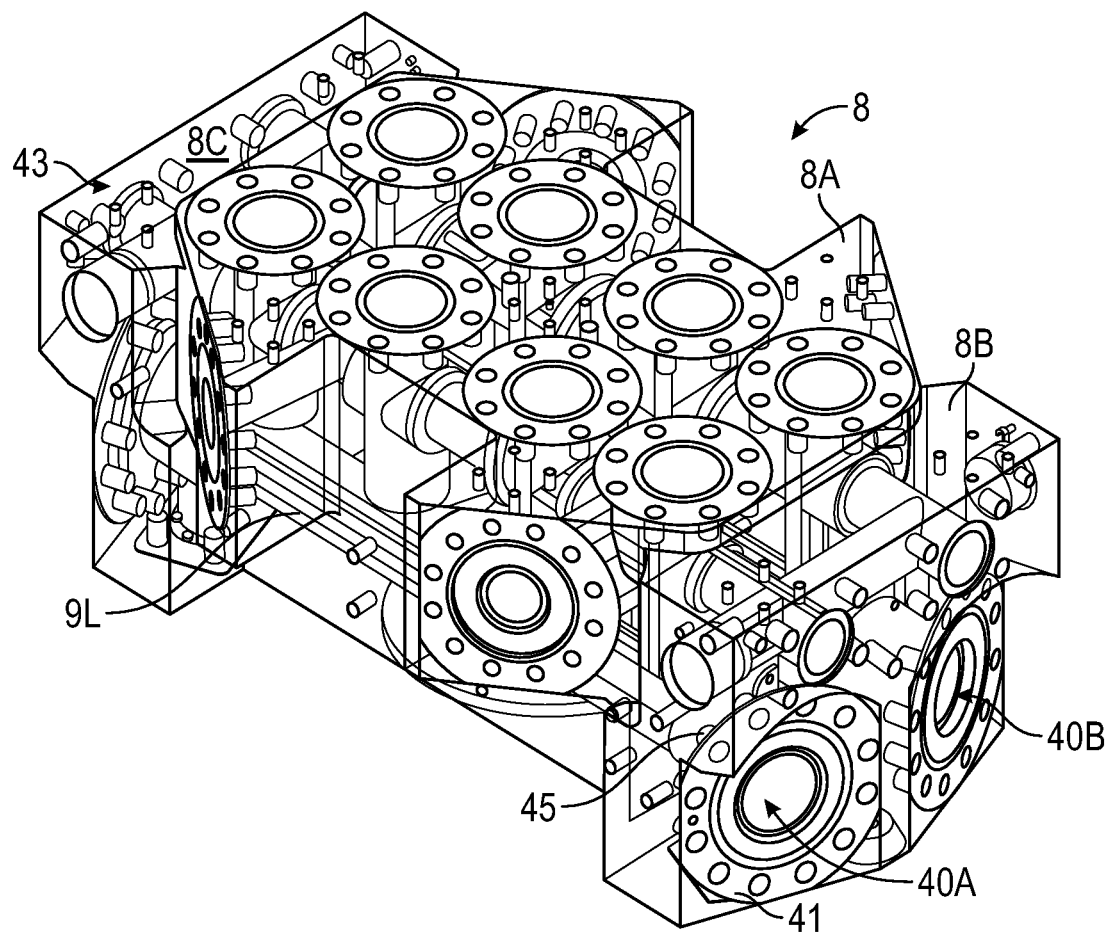
Figure 16C:
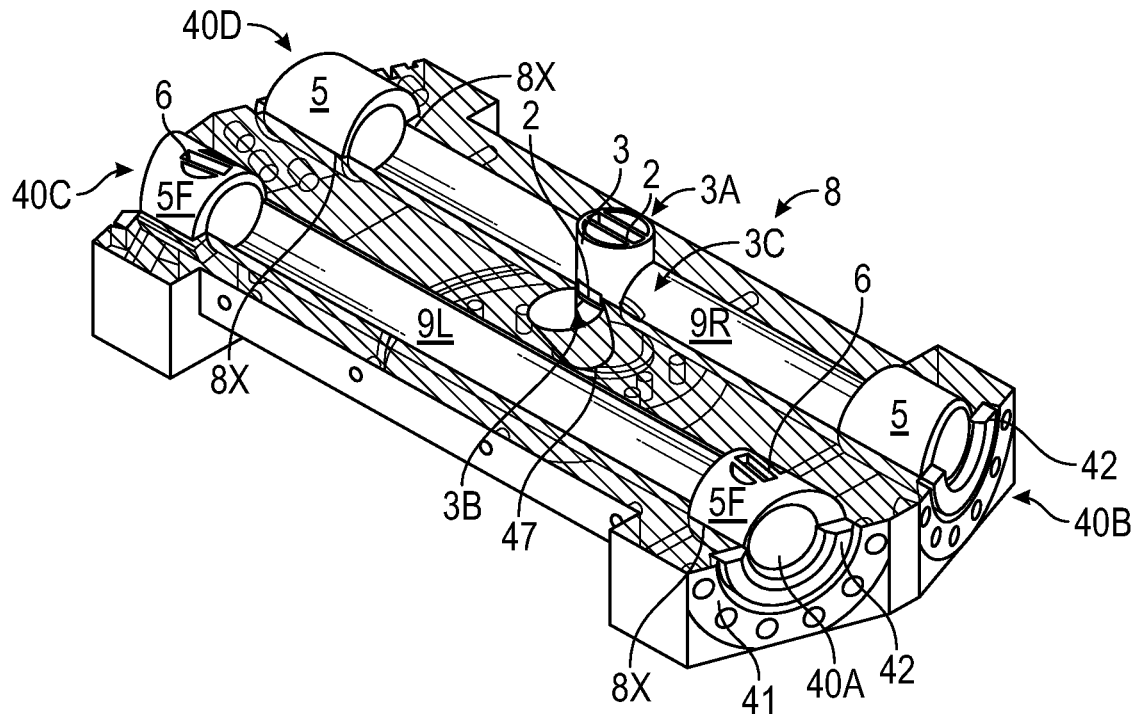
Figure 16D:
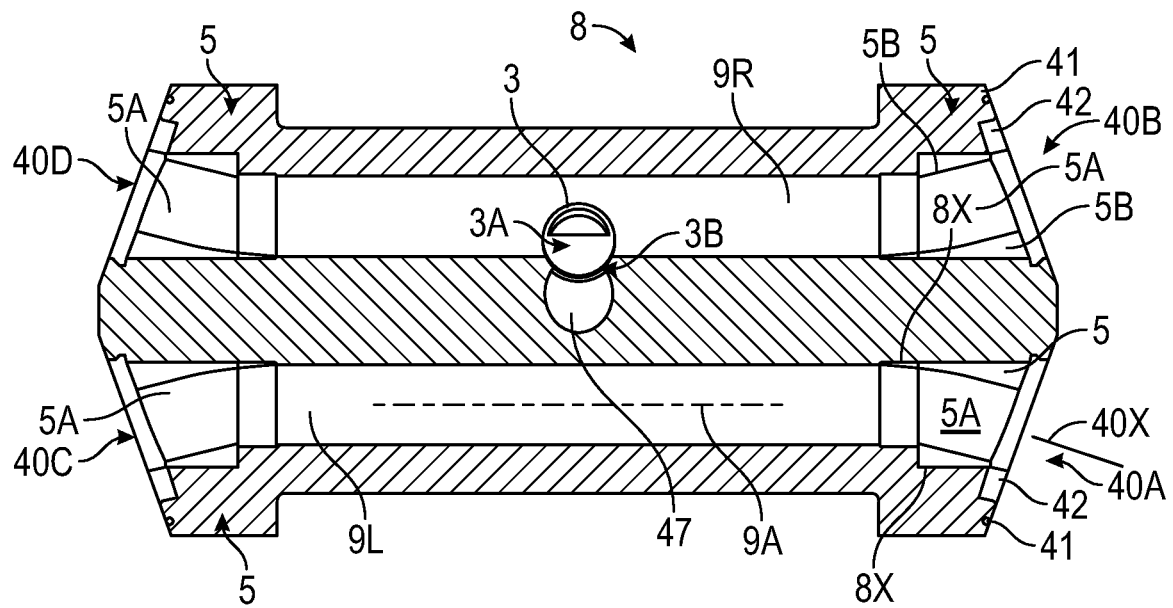
Figure 16E:
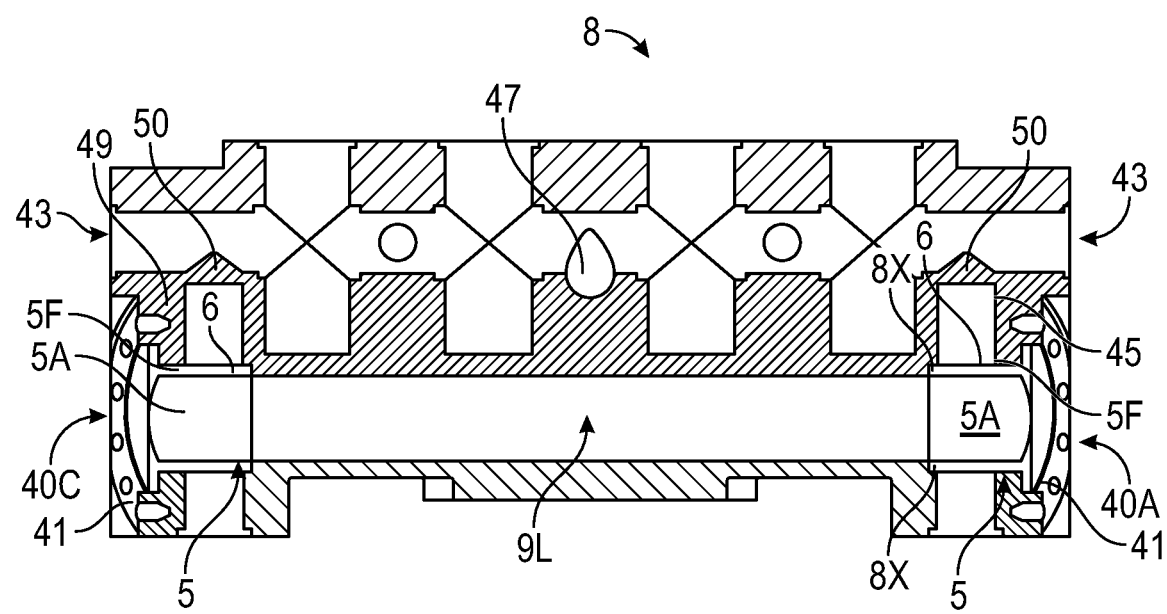

FIGS. 16A-16E are several views of an illustrative embodiment of a pig routing insert 5 disclosed herein which comprises a curved inner flow path 5A that extends at least partially through the pig routing insert 5. A FIG. 16A is a perspective view of an illustrative embodiment of a machined block manifold 8 comprising a plurality of perforated fluid flow openings or passages formed in the manifold 8. FIG. 16B is the same view as FIG. 16A, wherein the body of the manifold 8 is faded to show some of the perforated fluid flow openings or fluid flow passages formed within the manifold 8. FIG. 16C is a perspective view in horizontal section of an illustrative embodiment of a manifold 8 disclosed herein with a plurality of pig routing inserts 5 installed therein. FIG. 16D is a plan view in horizontal section of an illustrative embodiment of a manifold 8 disclosed herein, in which the section/cut is taken through the fluid flow headers 9L and 9R formed within the manifold 8. FIG. 16E is a vertical cut taken through manifold 8 and center line 9A of fluid flow header 9L.

As shown in FIGS. 16A-16E, an illustrative embodiment of a machined manifold 8 disclosed herein generally comprises a main body 8A and two illustrative end portions 8B, 8C which are threaded to main body 8A. As illustrated in these drawings, several perforated or drilled fluid flow passages have been formed in the manifold 8. More specifically, the manifold 8 comprises a plurality of fluid flow headers 9L, 9R referenced in general by using the number 9, which are positioned substantially parallel to each other. As illustrated, a pig routing insert 5 is positioned adjacent to each of the opposite ends of the headers 9. As best seen in FIG. 16D, the manifold comprises a plurality of primary flow inlets/outlets 40A-40D, referenced in general by using the number 40. More specifically, primary flow inlets/outlets 40A and 40D are in uninterrupted communication with header 9L, while primary flow inlets/outlets 40B and 40C are in uninterrupted communication with header 9R. Depending on the specific application, and the desired fluid path flowing through the manifold, the primary flow inlets/outlets 40 can function as either a fluid inlet or a fluid outlet. A threaded flange 41 and seal 42 are provided at each of the primary flow inlets/outlets 40 to facilitate coupling of the flow lines (not shown) to the manifold 8.

Referring to FIG. 16D, in an illustrative embodiment, the center lines 40X of the primary flow inlets/outlets 40 can be oriented at an angle in relation to the center line of its associated header 9, for example, the center lines 40X of primary flow inlets/outlets 40A, 40D are positioned at an angle to the center line 9A of header 9L. In reference to the FIGS. 16B and 16E, an illustrative fluid flow passage 43 is in uninterrupted communication with the header 9L through a first downwardly directed fluid flow passage 45 which is poured into the pig routing insert 5 associated with the primary flow inlet/outlet 40A and a second downwardly directed fluid flow passage 49 which is poured into the pig routing insert 5 associated with the primary flow inlet/outlet 40D. Several valves positioned within the flow passage 43 can be activated to direct the fluid flow to the header 9L, as desired. An insert 50 composed of a corrosion-resistant material, such as Inconel, is also shown in FIG. 16D. Insert 50 can be provided to ensure that there is no space in the corrosion-resistant materials and in the base materials, for example, carbon steel, of the manifold body 8.

As best seen in FIGS. 16C and 16D, the illustrative pig routing insert 1 (see FIGS. 2A and 2B) is installed at an intersection between the header 9R, a downward slopped fluid flow passage 47 and a downwardly directed fluid flow passage (not shown) which is located vertically above opening 3A in the pig routing insert 1. The fluid flow from the angular fluid flow passage 47 enters the header 9R passing through the partially restricted opening 3B with pig blocking structures 2 positioned therein, while the fluid flow from the downwardly directed fluid flow passage (not shown) enters header 9R passing through the partially restricted opening 3A. The fluid flowing inside the header 9R flows through the substantially unrestricted flow opening 3C formed in the pig routing insert 1.

As best seen in FIGS. 16C-16E, the pig routing insert 5 comprises a substantially unrestricted inner curved flow opening 5A with curved surfaces 5B. The curved opening 5A provides a smooth transition without any significant gaps, so that a cleaning pig (not shown) flows, for example, from inside the header 9L and passes out through the primary flow inlet/outlet 40A. The amount of curvature of the curved opening 5A may vary depending on the specific application, but the intention is to provide a smooth transition in the overall flow path due to the fact that the primary flow inlets/outlets 40 are positioned at an angle 40X relative to their associated header 9. As illustrated in the drawings, as well as in FIGS. 2A and 2B, the pig routing insert 5 comprises a partially restricted flow opening 5F which has a plurality of pig blocking structures 2 positioned therein. The flow opening 5F in the pig routing insert 5 associated with the primary flow inlet/outlet 40A is adapted to receive fluid flow from the downwardly directed flow passage 45 which is in uninterrupted communication with the flow passage 43. The flow opening 5F in the pig routing insert 5 associated with the primary flow inlet/outlet 40D is adapted to receive fluid flow from the downwardly directed flow passage 49 which is in uninterrupted communication with the flow passage 43. Note that the pig routing inserts 5 in header 9R have only the curved opening 5A defined therein. Note also that each of the pig routing inserts 5 is positioned within a recess 8X formed within the body of the manifold 8.

As will be appreciated by those skilled in the art after a thorough reading of the present patent application, the various embodiments of the pig routing insert or drains disclosed herein may have a variety of different configurations depending on the specific application. For example, pig blocking structures or bars positioned within a partially restricted opening of the pig routing insert or drain can be of any desired size, shape, configuration or number, as long as they allow substantially unrestricted fluid flow through the partially restricted opening whilst blocking the passage of a cleaning pig through the partially restricted opening. For example, the pig blocking structures can take the form of the illustrative pig blocking structures 20X, or they can be structures similar to a cylindrical rod.

In an illustrative embodiment, the pig routing structures disclosed herein may comprise at least one substantially unrestricted flow opening and at least one partially restricted flow opening having at least one pig blocking structure positioned within the partially restricted opening. The substantially unrestricted flow opening is adapted to allow the substantially unrestricted fluid flow through the opening and to allow a cleaning pig (not shown) to pass through the substantially unrestricted flow opening. The partially restrict opening is adapted to allow substantially unrestricted fluid flow whilst also blocking the passage of a cleaning pig through the partially restricted opening. In some applications, the pig routing structure may not comprise any partially restricted flow openings. In addition, in some applications, the pig routing structures disclosed herein can be positioned at an intersection between multiple flow lines. For example, referring to FIGS. 4A and 4B, the illustrated portion of the manifold 8 comprises five illustrative flow lines 60-64 that intersect at a common intersection 70 within the manifold 8. In this embodiment, the illustrative pig routing structure 21 comprises two substantially unrestricted flow openings 21A, 21C which are aligned with flow lines 60 and 62, respectively. The pig routing structure 21 also comprises partially restricted flow openings 21B, 21D and 21E which are aligned with flow lines 61, 63 and 64, respectively. Note that each of the partially restricted openings 61, 63 and 64 comprises a plurality of pig blocking structures 21X. In this example, the pig routing structure 21 allows a cleaning pig to pass through flow lines 60 and 62 whilst blocking the entrance of the cleaning pig into the flow lines 61, 63 and 64.

The specific embodiments described above are illustrative only, since the object described can be modified and practiced in different but equivalent ways, which are evident to those skilled in the art having the benefit of the teachings presented herein. For example, the process steps set out above can be performed in a different order. In addition, no limitation applies to the details of construction or design shown herein, except as described in the claims below. It is, therefore, evident that the specific embodiments revealed above can be altered or modified, and all such variations are considered to be within the spirit and scope of the claimed object. Note that the use of terms such as "first", "second", "third" or "fourth" to describe various processes or structures in this specification and in the attached claims is used only as an abbreviated reference for such steps/structures, and does not necessarily imply that these steps/structures are carried out/formed in that ordered sequence. Obviously, depending on the exact claim language, an ordered sequence of such processes may be necessary or not. Therefore, the protection sought herein is as set out in the claims below.

The invention claimed is:

1. A pig routing insert configured for installation in a structure, the pig routing insert comprising:
   a cylindrical insert body configured to be positioned at an intersection of at least two perforated fluid flow holes defined within a body of the structure;

a first substantially unrestricted flow opening defined in the cylindrical insert body which is configured to allow substantially unrestricted fluid flow and a cleaning pig to pass through the substantially unrestricted flow opening;
a second substantially unrestricted flow opening defined in the cylindrical insert body which is configured to allow substantially unrestricted fluid flow and the cleaning pig to pass through the substantially unrestricted flow opening; and
a plurality of partially restricted flow openings defined in the cylindrical insert body comprising at least one pig blocking structure positioned within each partially restricted flow opening, wherein the plurality of partially restricted flow openings comprises a first partially restricted flow opening formed in an end surface of the cylindrical insert body and a second partially restricted flow opening formed in a cylindrical side surface of the cylindrical insert body, wherein each of the plurality of partially restricted flow openings is configured to allow substantially unrestricted fluid flow through the plurality of partially restricted flow openings whilst blocking passage of the cleaning pig through the plurality of partially restricted flow openings.

2. The pig routing insert, according to claim 1, wherein the cylindrical insert body of the pig routing insert comprises stainless steel.

3. The pig routing insert, according to claim 1, wherein the first substantially unrestricted flow opening has a segmented circular sectional configuration.

4. The pig routing insert, according to claim 3, wherein the plurality of partially restricted openings has a circular sectional configuration.

5. The pig routing insert, according to claim 1, wherein at least one of the pig blocking structures comprises one of a cylindrical bar or rod.

6. The pig routing insert, according to claim 1, wherein the at least one pig blocking structure is configured to allow the substantially unrestricted fluid flow to pass substantially unrestricted in x, y, and z directions relative to an axis of the cylindrical insert body, allowing passage of the cleaning pig only in the x direction.

7. A structure comprising:
a body comprising at least first, second, third, and fourth perforated fluid flow holes that meet each other at an intersection within the body;
a pig routing insert positioned at the intersection in the body, the pig routing insert comprising:
a cylindrical insert body;
a first substantially unrestricted flow opening extending through the cylindrical insert body, the first substantially unrestricted flow opening being in uninterrupted communication with the first perforated fluid flow hole so as to allow substantially unrestricted fluid flow and a cleaning pig to pass through from the first perforated fluid flow hole through the first substantially unrestricted flow opening;
a second substantially unrestricted flow opening extending through the cylindrical insert body, the second substantially unrestricted flow opening being in uninterrupted communication with the fourth perforated fluid flow hole so as to allow substantially unrestricted fluid flow and the cleaning pig to pass through from the fourth perforated fluid flow hole through the second substantially unrestricted flow opening;
a plurality of partially restricted flow openings defined in the cylindrical insert body comprising at least one pig blocking structure positioned within each partially restricted flow opening, wherein the plurality of partially restricted flow openings comprises a first partially restricted flow opening formed in an end surface of the cylindrical insert body and a second partially restricted flow opening formed in a cylindrical side surface of the cylindrical insert body, wherein the first partially restricted flow opening is in uninterrupted communication with the second perforated fluid flow hole to allow substantially unrestricted fluid flow from the second perforated fluid flow hole through the first partially restricted flow opening whilst blocking a passage of the cleaning pig through the first partially restricted flow opening, and wherein the second partially restricted flow opening is in uninterrupted communication with the third perforated fluid flow hole to allow substantially unrestricted fluid flow from the third perforated fluid flow hole through the second partially restricted flow opening whilst blocking the passage of the cleaning pig through the second partially restricted flow opening;
a first lining that is formed on an inner surface of the first perforated fluid flow hole; and
a second lining that is formed on an inner surface of the second perforated fluid flow hole.

8. The structure, according to claim 7, wherein the cylindrical insert body of the pig routing insert comprises a material that is different from a material of the body of the structure.

9. The structure, according to claim 7, wherein the cylindrical insert body of the pig routing insert comprises stainless steel.

10. The structure, according to claim 9, wherein the first and the second linings comprise one of stainless steel.

11. The structure, according to claim 7, wherein the first substantially unrestricted flow opening has a segmented circular sectional configuration.

12. The structure, according to claim 11, wherein the plurality of partially restricted flow openings has a circular sectional configuration.

13. The structure, according to claim 7, wherein the structure is a subsea manifold.

14. The structure, according to claim 7, further comprising a sleeve positioned at the intersection and within the second perforated fluid flow hole, wherein the sleeve is composed of a material that is different of a material of the body of the structure.

15. The structure, according to claim 14, wherein at least a portion of the cylindrical insert body of the pig routing insert is positioned within the sleeve.

16. The structure, according to claim 15, wherein an inner surface of the sleeve is an inner machined surface and wherein at least a portion of an outer surface of the cylindrical insert body of the pig routing insert comes into contact with the machined inner surface of the sleeve.

17. A method comprising:
manufacturing a pig routing insert, the pig routing insert comprising:
a first substantially unrestricted flow opening defined in a cylindrical insert body of the pig routing insert which is configured to allow substantially unrestricted fluid flow and a cleaning pig to pass through the substantially unrestricted flow opening;
a second substantially unrestricted flow opening defined in the cylindrical insert body which is configured to allow substantially unrestricted fluid flow and the cleaning pig to pass through the substantially unrestricted flow opening; and a plurality of partially restricted flow openings defined in the cylindrical insert body comprising at least one pig blocking structure positioned within each partially restricted flow opening, wherein the plurality of partially restricted flow openings comprises a first partially restricted flow opening formed in an end surface of the cylindrical insert body and a second partially restricted flow opening formed in a cylindrical side surface of the cylindrical insert body, wherein the plurality of partially restricted flow openings is configured to allow substantially unrestricted fluid flow through the plurality of partially restricted flow openings whilst blocking passage of the cleaning pig through plurality of partially restricted flow openings;

positioning the manufactured pig routing insert at an intersection of first and second perforated fluid flow holes previously formed in a body of a structure; and fastening the manufactured pig routing insert within the intersection in the body.

18. The method, according to claim 17, wherein the fastening of the manufactured pig routing insert within the intersection in the body comprises welding opposite ends of the manufactured pig routing insert that are positioned within the second perforated fluid flow hole.

19. The method, according to claim 17, wherein the positioning of the manufactured pig routing insert within the intersection comprises positioning the manufactured pig routing insert for the first substantially unrestricted flow opening to be in uninterrupted communication with the first perforated fluid flow hole so as to allow substantially unrestricted fluid flow from the first perforated fluid flow hole through the first substantially unrestricted flow opening.

20. The method, according to claim 19, wherein the positioning of the manufactured pig routing insert within the intersection comprises positioning the manufactured pig routing insert for the plurality of partially restricted flow openings to be in uninterrupted communication with the second perforated fluid flow hole to allow substantially unrestricted fluid flow from the second perforated fluid flow hole through the plurality of partially restricted flow openings whilst blocking the passage of the cleaning pig through the plurality of partially restricted flow openings.

21. A method, according to claim 17, further comprising, before positioning the manufactured pig routing insert at the intersection of the first and second perforated fluid flow holes:

positioning a corrosion-resistant material structure at the intersection by inserting the corrosion-resistant material structure at the intersection through the second perforated fluid flow hole;

fastening the corrosion-resistant material structure in position at the intersection by welding opposite ends of the corrosion-resistant material structure to an inner surface of the second perforated fluid flow hole;

carrying out at least a first combining operation through the first perforated fluid flow hole to define a first opening in the corrosion-resistant material structure;

carrying out a first welding process to form a lining material on an inner surface of the first perforated fluid flow hole and on an inner surface of the first opening in the corrosion-resistant material structure;

carrying out at least a second welding process to form a second lining material on the inner surface of the portions of the second perforated fluid flow hole which are positioned on opposite sides of the corrosion-resistant material structure; and carrying out at least a second combining operation through the second perforated fluid flow hole to define a second unlined opening in the corrosion-resistant material structure in order to define a sleeve positioned at the intersection.

22. The method, according to claim 21, wherein the positioning of the pig routing insert at the intersection of the first and second perforated fluid flow holes comprises positioning at least a portion of the pig routing insert within the sleeve.

23. The method, according to claim 21, wherein the corrosion-resistant material structure is a solid cylindrical body of corrosion-resistant material.

* * * * *